Figure 1:
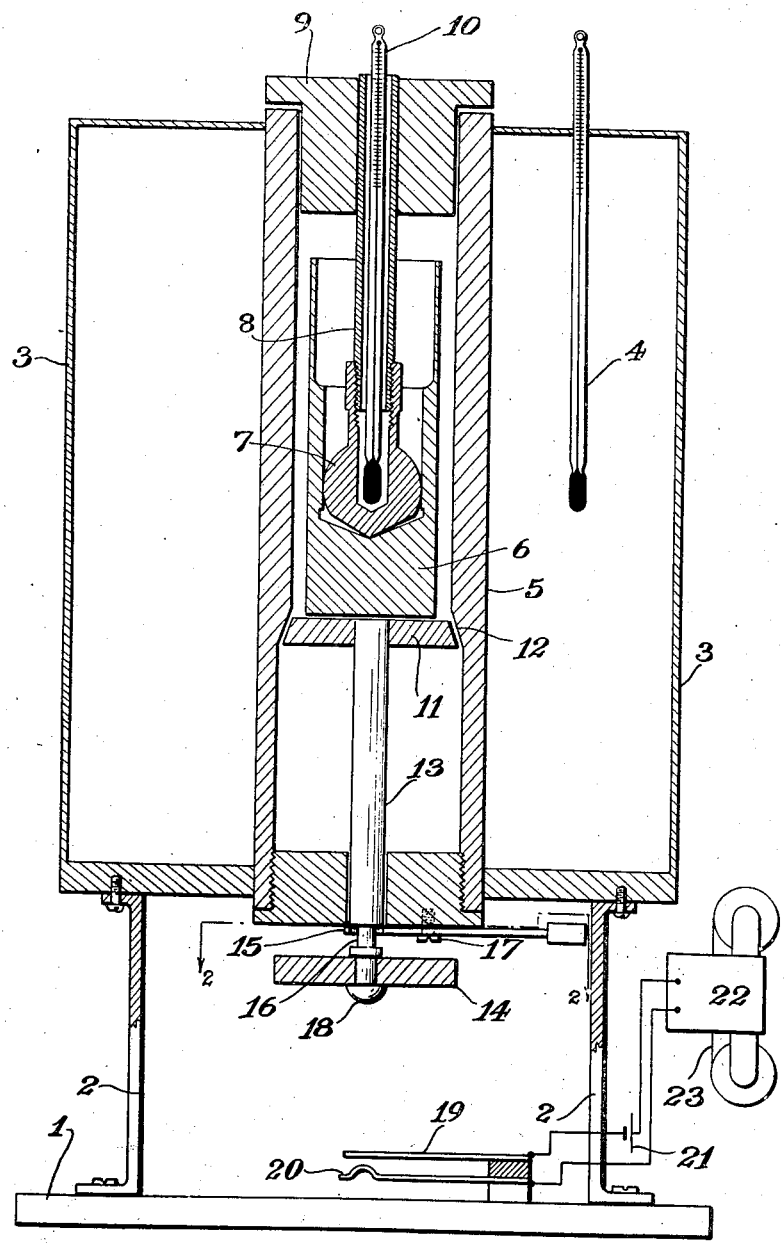

July 30, 1940.  E. S. L. BEALE  2,209,755
APPARATUS FOR MEASURING VISCOSITY
Filed Oct. 30, 1936  3 Sheets-Sheet 2

Inventor:
Evelyn S. L. Beale

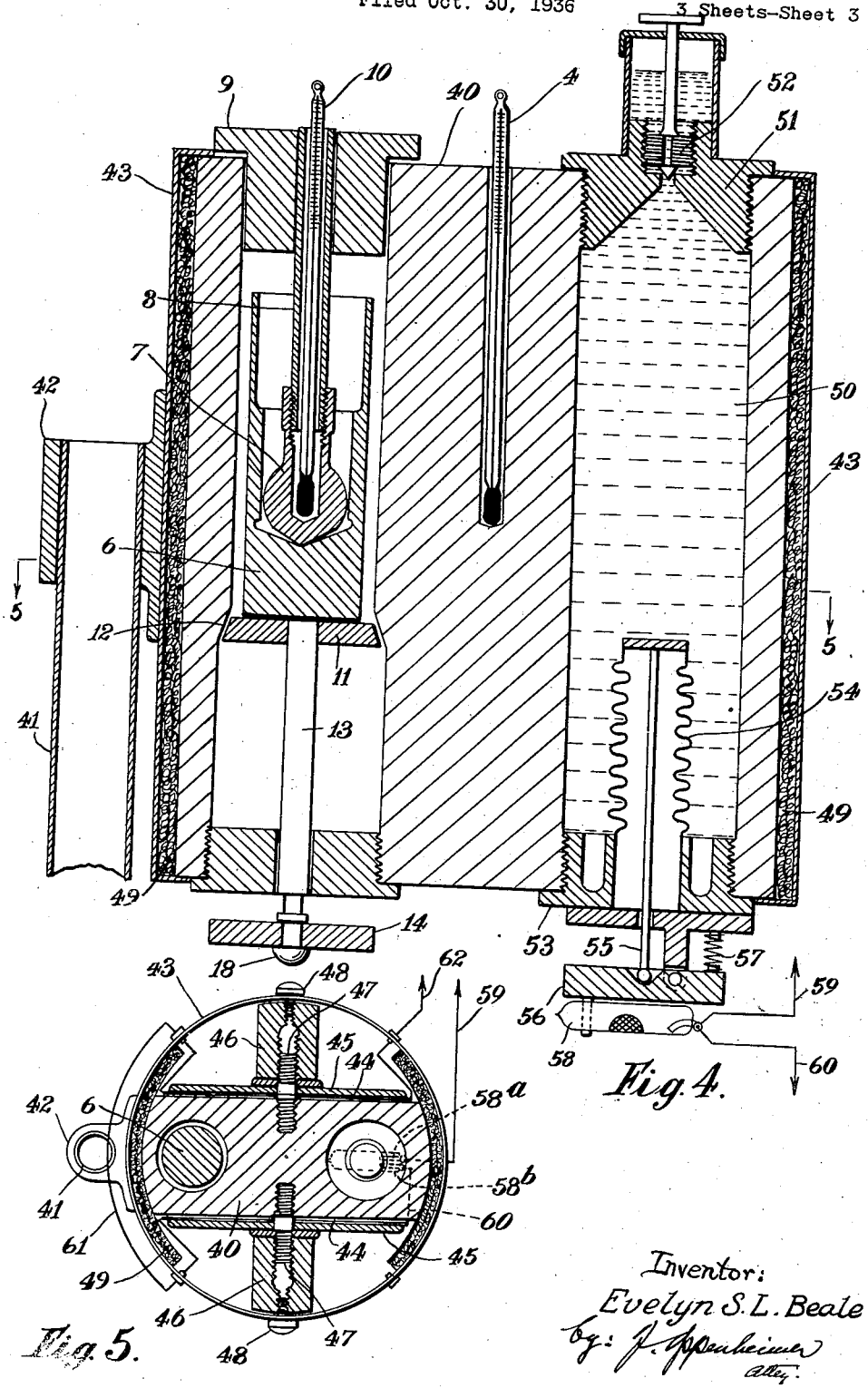

Patented July 30, 1940

2,209,755

UNITED STATES PATENT OFFICE 2,209,755

APPARATUS FOR MEASURING VISCOSITY

Evelyn Stewart Lansdowne Beale, Chelsea, London, England

Application October 30, 1936, Serial No. 108,419
In Great Britain November 4, 1935

5 Claims. (Cl. 265—11)

The present invention relates to apparatus for measuring the viscosity of fluids such as lubricating oil, fuel oil, molasses, road pitch and the like. It may also be applied to give an indication of the consistency of paints and other suspensions, emulsions and the like which do not exhibit a true viscosity.

There are many known methods of measuring viscosity, the apparatus for which purpose is known as a viscometer. Viscometers may be divided into two general classes—absolute viscometers in which the constant for converting the readings to absolute units can be calculated from the dimensions of the apparatus, and practical viscometers in which the constant must be determined experimentally from measurements on liquids of known viscosity. The present invention belongs to the latter class.

The essential feature of any practical viscometer is that it should give accurately repeatable readings of viscosity when measuring the viscosity of a given fluid at a fixed temperature and that it shall be convenient to use when measuring the viscosity of fluids of the type for which it is intended.

The principal object of the present invention is to provide simple apparatus which will measure the viscosity of fluids over a wide range of viscosities and temperatures with fair accuracy and good repeatability, an apparatus which requires only a small quantity of the fluid for its operation and which is readily adaptable to semi-automatic recording (in the sense that it can easily be made to actuate a stop clock to record the time of operation) and also to fully automatic operation.

The present invention consists of a modification of the well known "falling sphere" viscometer. As usually constructed, a steel or heavy metal ball is allowed to fall freely in the fluid under examination, which is contained in a vessel of suitable dimensions. If the containing vessel is very large compared with the steel ball the constant can be calculated from the size and weight of the ball by Stokes' Law. If the vessel is not much larger than the ball as for instance, if it takes the form of a tube with just enough clearance to allow the ball to fall or roll freely, the constant can only be calculated with difficulty but this forms a useful practical viscometer. By adjusting the clearance between the ball and the bore of the tube this form of apparatus can be made suitable for fluids such as oils of widely different viscosities.

The chief objection to this type of apparatus is the difficulty of observing the rate of fall of the ball, particularly in the case of black oils, and it is one of the objects of the present invention to remove this objection.

According to the present invention this arrangement is reversed and there is provided a viscometer, of the kind in which relative motion takes place between a vessel adapted to contain the fluid under test and a ball or the like, having means for fixedly supporting the ball or the like within the vessel. The vessel may be in the form of a cylindrical tube having its lower end closed, the support for the ball or the like being in the form of a rod passing out through the open upper end of the tube. The tube containing the fluid under test is thus allowed to fall under its own weight. In this way the relative motion of the tube and the ball can readily be observed. The tube containing the oil will henceforth be referred to as the "bucket".

According to a feature of the present invention, the bucket is made to fall more rapidly after it has dropped a predetermined distance by enlarging the bore of the bucket at a suitable point thereby very greatly reducing the resistance to motion beyond that point. The sudden increase in speed of the bucket can clearly then be used to indicate the termination of the test. The timing may be done by watching for this increase in speed or if desired the bucket itself may operate a stop clock by falling on a suitably placed mechanical linkage or upon suitable electric contacts.

Figure 2:
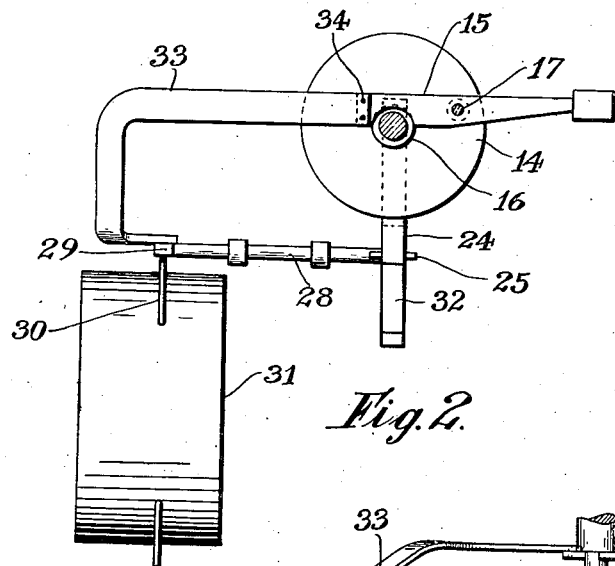
Figure 3:
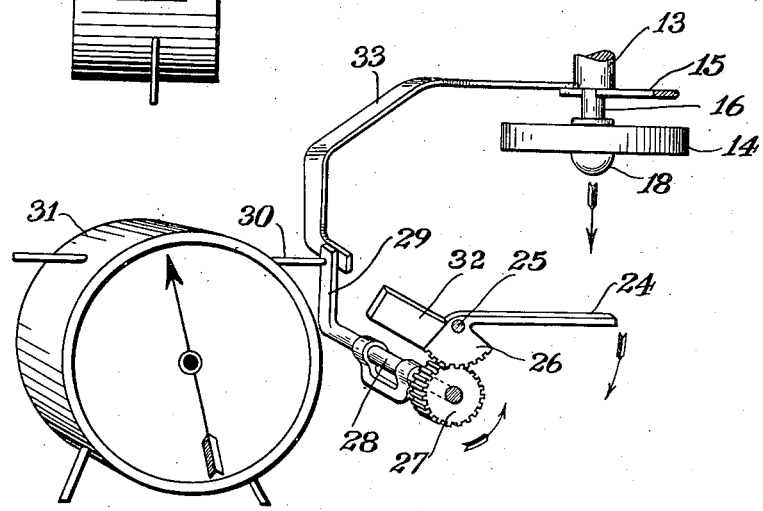

The invention will be described by way of example with reference to the accompanying drawings, in which Fig. 1 is a view in sectional elevation of a viscometer according to the present invention, Fig. 2 is a view of a detail of Fig. 1 in sectional plan along the line 2—2 of Fig. 1, and embodying a modified timing mechanism, Fig. 3 is a perspective view of the modified timing mechanism of Fig. 2, Fig. 4 is a view in sectional elevation of an alternative feature of the improved viscometer, and Fig. 5 is a sectional plan, on a smaller scale, taken on the line 5—5 in Fig. 4.

Like parts are given the same references in the several figures.

Referring to Fig. 1, a base 1 has mounted upon it through pillars 2 a water bath 3. Suitable known thermostatic means may be provided for maintaining the temperature of water within the chamber 3 at a fixed value, indicated by a thermometer 4. Within the water bath is fixed a tubular casing 5 to contain the viscometer itself. This latter comprises a "bucket" 6 and a "ball" 7. The bucket 6 is in the form of a tube having its lower end closed. The bore of the tube is circular in cross-section and the lower half of the bore is of smaller diameter than the upper half. The ball 7 is of substantially spherical shape but its lower end is formed as a cone with its apex slightly rounded. The ball 7 is carried by a hollow rod 8 which is fixed to a block 9 which engages in the upper end of the tubular casing 5. A thermometer 10 is arranged in the hollow rod 8 and its bulb lies within the ball 7.

The bucket 6 rests upon a disc shaped member 11 having a conical edge surface adapted to engage with a similarly shaped seating 12 in the casing 5. The member 11 is connected by a rod 13 with a hand wheel 14.

Before an experiment is carried out, the member 11 is forced into engagement with the seating 12 by means of the hand wheel 14 and remains in this position on account of the acuteness of the taper of the seating. The fluid to be tested is arranged within the bucket 6. Under these conditions there is good thermal connection between the bucket and the water bath 3 through the casing 5, seating 12 and member 11. The bucket and its contents therefore assume the temperature of the water bath 3 rapidly and with a high degree of accuracy. When the thermometers 4 and 10 indicate substantially the same temperature, the apparatus is in condition for a determination of viscosity to be made. For this purpose the member 11 is moved into the position shown in the drawings, clear of the seating 12, by means of the hand wheel 14. The member 11 is then supported by a catch 15 which engages with the upper edge of a recess 16 formed in the rod 13. This is clearly shown in Fig. 2. The catch 15 is pivoted at 17 and when it is moved to clear the edges of recess 16, the member 11, rod 13 and hand wheel 14 fall under the action of gravity until a button 18 on the hand wheel comes into engagement with a blade 19 of an electric switch. The impact upon the blade 19 forces this blade into contact with the lower blade 20 of the switch and momentarily closes a circuit through a battery 21 and means indicated diagrammatically at 22 for producing an indication upon a moving photographic film or tape 23. The marking of the film or tape may be effected photographically, in which case the electric impulse produced by closure of switch 19, 20 is arranged to produce a flash of light on the film 23 or the marking may be effected mechanically as in an ink printer as used in telegraphy.

The indicating means 22 may take the form of an electrically controlled clock or other time-interval meter, in which case the film or tape 23 is not required. The closures of the circuit through battery 21 may then serve to start and stop the meter and the required time interval may then be read directly therefrom.

In the arrangement of Fig. 1 in which electrical timing is used, the catch lever 15 is terminated at 34 in Fig. 2 and the mechanism to be described later associated with the extension 33 of this lever 15 in Fig. 2 is omitted.

When the member 11 falls, as above described, the bucket 6 is freed and commences to fall under the action of gravity, the slight clearance provided between the upper edge of the tubular casing 5 and the block 9 which supports the ball 7 being immediately taken up. This is the start of the working travel of the ball relatively to the bucket. The rate of falling of the bucket depends upon the viscosity of the fluid therein. As soon as the horizontal great circle of the ball 7 reaches the enlarged upper part of the bore of the bucket 6 the working travel of the ball relatively to the bucket is completed and the bucket falls rapidly on to the member 11 transmitting a second blow to the blade 19, again closing the switch 19, 20 and producing a second mark upon the travelling film or tape 23. The film or tape 23 is arranged to move at a known uniform speed and the distance between the two markings is a measure of the time taken for the ball to travel a fixed distance through the fluid in the bucket. Errors due to the difference between the moment of release of the member 11 and the moment of closure of switch 19, 20 and between the moment at which the bucket reaches the point at which it begins to fall rapidly and the moment at which the bucket strikes the member 11 and again closes the switch 19, 20, can be corrected by suitable calibration.

In one example of the apparatus above described, the following dimensions are employed:

| | |
|---|---|
| Diameter of spherical portion of ball 7 _____ inches__ | .777 |
| Internal diameter of the lower part of the bore of bucket 6 _____ do____ | .785 |
| Internal diameter of the upper part of the bore of bucket 6 _____ do____ | .945 |
| Length of working travel of ball relative to bucket _____ do____ | .8 |
| Weight of bucket _____ grammes__ | 100 |
| Volume of oil in bucket for test _____ millilitres__ | 10 |

The ball 7 may be made spherical between horizontal planes ¼ inch on each side of the horizontal great circle and above and below this region may be coned. The lower end may have an apex angle of about 135°. The conical lower end of the bore in the bucket may have an apex angle of about 150°.

The constant of an apparatus of these dimensions is approximately 3.4, that is to say, the viscosity in centipoises is given by multiplying the time in seconds required for the bucket to fall through its working travel by 3.4.

Viscometers of this type can be made with constants larger or smaller than this simply by altering the size of the ball used in a given sized bucket or vice versa. Preferably the bucket is made with truly cylindrical bore and the ball is made as nearly spherical as possible and accurately circular at the horizontal great circle.

If the ball is truly spherical the diameter of the horizontal great circle will be the same even if the ball is rotated slightly about a horizontal axis. This corresponds to a slight error in levelling the base 1, whereas of course the bucket will always hang vertical. Furthermore, if the horizontal section of the ball (at the great circle) and the bucket are made as accurately circular as possible, the shape of the clearance space between the ball and the bucket will change as little as possible when the bucket is rotated about a vertical axis with respect to the ball. The calibration constant of the instrument will then be for practical purposes independent of the relative position of the ball and bucket.

The material used for the construction both of the ball and the bucket should preferably be very hard, to avoid abrasion, and non-corrodible, e. g. hardened stainless steel. It should have a stable structure and be suitably aged before the final grinding operation, so that the shape of the bucket will not change subsequently, either with age or by being maintained at the normal working temperature for viscosity measurements. It is important also that the material from which the ball is constructed should have exactly the same coefficient of expansion as that of the bucket, and for this reason both parts should preferably be made from the same steel billet. The reason for this is clearly to avoid substantial variation in the clearance area when the temperature of both parts is altered, as for instance when measuring viscosity at a high temperature. Any substantial difference in the coefficient of expansion might obviously alter seriously the clearance between the ball and the bucket and so change the calibration constant, especially where the clearance is small.

The exact value of the constant clearly depends on the specific gravity of the fluid and the way the viscometer is used. If the bucket falls in air, the force producing the motion is the weight of the bucket plus a certain fraction (approximately half) of the fluid contained in it.

A correction to the constant may if desired be applied for differences in the specific gravity of the fluid, but for many purposes, when testing oils for example, the error involved in assuming the specific gravity to be .900 whatever oil is used is small enough to be neglected.

In a modified arrangement, the bucket is located in a vessel giving at all times large clearances around the bucket 6 and around the disc 11, the area of contact between the bucket 6 and the disc 11 being substantially less than is shown in Fig. 1. This vessel is filled with the same fluid as is contained in the bucket, that is the fluid under test. In this case the force causing the motion to take place is the weight of the bucket minus the buoyancy of the fluid displaced by it. This constant will be slightly smaller than that for use in air and will also depend to a small extent on the specific gravity of the fluid, but the variation can often be neglected.

A modified indicating mechanism is shown diagrammatically in Figs. 2 and 3. Only a small part of the apparatus of Fig. 1 is shown in Fig. 3, and it is to be understood that the mechanism of Fig. 3 is intended to replace only the parts 19, 20, 21, 22 and 23 of Fig. 1.

As is most clearly shown in Fig. 3, a lever 24 arranged in the path of the button 18 is pivotally mounted at 25. This lever carries a toothed segment 26 which engages a toothed wheel 27 carried on a rotatably mounted shaft 28. This shaft 28 carries at one end a lever 29 which can engage a rod 30 acting as trigger for starting and stopping the indicator of a stop clock 31. The arrangement is such that when the rod 30 is in the position shown the clock indicator is stopped and when the rod 30 is pressed upward in Fig. 2 or to the right in Fig. 3 the indicator is started.

The catch lever 15 by which the hand wheel 14 is supported has fixed thereto an extension 33, the free end of which is in engagement, through the end of lever 29, with one end of the rod 30.

Now when the rod 30 is pressed upwards in Fig. 2 and the clock indicator is started, the catch lever 15 is rotated clockwise to release the hand wheel 14, and hence the bucket 6. The hand of the operator is held on the rod 30 until the button 18 has struck the lever 24 thus avoiding the risk of the clock indicator being stopped by the impact upon the lever 24. A balance weight 32 is also provided on lever 24 to balance the weight of parts 11, 13 and 14 to prevent this weight from actuating the clock stopping mechanism. When, however, the bucket falls upon the member 11 (Fig. 1) the operator's hand has been removed and the blow transmitted to the lever 24 rotates the lever 29 counterclockwise in Fig. 3 and presses the rod 30 to the left, stopping the clock indicator. The time occupied by the bucket 6 in its working travel is thus indicated by clock 31. The arrows in Fig. 3 indicate the direction of motion of the parts when the bucket 6 falls.

Instead of mounting the bucket within a tube such as 5 in Fig. 1, within a water bath, uniformity of temperature can be obtained by locating the bucket within an aperture bored vertically in a relatively large and solid block of material of good thermal conductivity. Such an arrangement is shown in Figs. 4 and 5. The bucket 6 is located within an aperture in a copper block 40, which is supported from a base (not shown) by a tube 41 fixed to a bracket 42 which in turn is fixed to a tubular casing member 43 surrounding the block 40. Electrical heating elements 44 are clamped against the sides of the block by means of plates 45 retained by nuts 46 engaged with studs 47. The outer ends of the nuts 46 are shaped to fit the interior surface of the casing 43 in which the block is secured by means of screws 48, a heat-insulating packing 49 being interposed between the casing and the ends of the block. The means for controlling and measuring the time of fall of the bucket, which are not shown in Figs. 4 and 5, may be of the type as described with reference to Figs. 1 to 3.

The temperature of the block can be maintained substantially constant by means of a thermostatic regulator of known kind. The regulator shown in Fig. 4 is of the liquid-filled type. A cylindrical chamber 50 in the block 40 is closed at its upper end by a cap 51 comprising a combined filling and air-venting valve 52, and at its lower end by a tubular cap 53 and bellows 54. A rod 55 fixed to the upper end of the bellows 54 engages and actuates a rocker 56 pivotally mounted on the cap 53 and urged in a clockwise direction by a compression spring 57. A mercury switch 58 fixed to the rocker 56 has one electrode 58a (Fig. 5) connected by a conductor 59 to one terminal of a source of electrical power and its other electrode 58b connected to the other terminal of the power source through a conductor 60, one of the heating elements 44, a conductor 61, the other element 44, and a conductor 62.

When the block 40 is cold, the liquid in the chamber 50 is contracted and the bellows 54 are consequently expanded, the mercury switch 58 being closed. When the heating elements 44 have warmed the block to a predetermined temperature, expansion of the fluid in the chamber 50 has contracted the bellows 54 sufficiently to open the mercury switch by means of the rod 55. Slight cooling of the block causes the switch to close again, so that the temperature of the block is maintained within a range of a few degrees.

There is a well known viscometer, known as the Michell viscometer, in which the steel ball falls from an inverted cup thereby indicating the end of the operation. The disadvantage of such an arrangement is that the ball itself may become mechanically damaged by the impact, whereas it will be evident that with the present invention only the outside of the bucket is subjected to impact and the exact shape of this is of no consequence. Furthermore, by using a much larger quantity of oil than in the Michell viscometer the exceedingly fine clearances can be avoided thereby making the readings very much more nearly repeatable in the presence of minute quantities of impurity in the oil and conferring other obvious advantages in construction.

By providing a number of balls of slightly different diameters the constant of the apparatus can be changed to suit fluids up to extremely high viscosities.

I claim:

1. A viscometer comprising a base member, a vessel to contain a fluid to be tested, a fluid displacing member fixedly supported relative to said base member and rigidly suspended within said vessel for displacing downwards a fluid contained in said vessel when said vessel falls, said displacing member having a circular cross section in a horizontal plane, said vessel having a lower portion, closed at its bottom, and an upper portion, said lower portion having predetermined internal height and an internal diameter slightly greater than that of said horizontal cross section of said displacing member, said upper portion having a substantially greater internal diameter than said lower portion, removable means for supporting said vessel in a predetermined initial position where said displacing member is close to the bottom of said lower portion, said means when removed allowing said vessel to fall downwards under the action of gravity relative to said fixed displacing member over a distance exceeding the height of said lower portion so that said displacing member enters said upper portion during the continued fall of said vessel and first a retarded speed of said fall results when said vessel containing a fluid to be tested travels from said initial position downwards relative to said fixed displacing member and thereafter said speed considerably increases when upon continued fall said displacing member enters said upper portion, said increase of speed being indicative for said displacing member having left said lower portion of predetermined internal height.

2. A viscometer comprising a base member, a tubular vessel of circular cross section to contain a fluid under test, a fluid displacing member fixedly supported relatively to said base member within said vessel and having a circular cross section in a horizontal plane, said vessel having a lower portion of internal diameter slightly greater than that of said circular cross section and an upper portion of greater internal diameter than the lower portion, said vessel being capable of vertical movement, in a direction parallel to its axis relatively to said displacing member under the action of gravity, a stop positioned to be struck by said vessel when said vessel has reached a position in which said displacing member is within said upper portion of said vessel, time indicating means and means whereby a blow upon said stop is caused to actuate said time indicating means.

3. A viscometer comprising a base member, a tubular vessel of circular cross section to contain a fluid under test, a fluid displacing member fixedly supported relatively to said base member within said vessel and having a circular cross section in a horizontal plane, said vessel having a lower portion of internal diameter slightly greater than that of said circular cross section and an upper portion of greater internal diameter than the lower portion, said vessel being capable of vertical movement in a direction parallel to its axis relatively to said displacing member under the action of gravity, a stop capable of supporting said vessel in a position in which said fluid displacing member is within said lower portion of said vessel, means for releasing said stop to allow said stop to move vertically downward, and means for limiting the downward motion of said stop so that on release it falls to a position in which it is struck by said vessel when said displacing member is within the upper portion of said vessel.

4. A viscometer comprising a base member, a tubular vessel of circular cross section to contain a fluid under test, a fluid displacing member fixedly supported relatively to said base member within said vessel and having a circular cross section in a horizontal plane, said vessel having a lower portion of internal diameter slightly greater than that of said circular cross section and an upper portion of greater internal diameter than the lower portion, said vessel being capable of vertical movement in a direction parallel to its axis relatively to said displacing member under the action of gravity, a stop capable of supporting said vessel in a position in which said displacing member is within said lower portion of said vessel, means for releasing said stop to allow said stop to move vertically downward, means for limiting the downward motion of said stop so that on release it falls to a position in which it is struck by said vessel when said fluid displacing member is within the upper portion of said vessel, and time indicating means operatively associated with said stop whereby said indicating means can give an indication of the time interval between the moment at which said stop reached said limiting means and the moment at which said stop is struck by said vessel.

5. A viscometer comprising a base member, a tubular vessel of circular cross section to contain a fluid under test, a fluid displacing member fixedly supported relatively to said base member within said vessel and having a circular cross section in a horizontal plane, said vessel having a lower portion of internal diameter slightly greater than that of said circular cross section and an upper portion of greater internal diameter than the lower portion, said vessel being capable of vertical movement in a direction parallel to its axis relatively to said displacing member under the action of gravity, a stop capable of supporting said vessel in a position in which said fluid displacing member is within said lower portion of said vessel, means for releasing said stop to allow said stop to move vertically downward, means for limiting the downward motion of said stop so that on release it falls to a position in which it is struck by said vessel when said fluid displacing member is within the upper portion of said vessel, and time indicating means operatively associated with said stop whereby said indicating means can give an indication of the time interval between the moment at which said stop is released and the moment at which said stop is struck by said vessel.

EVELYN STEWART LANSDOWNE BEALE.